United States Patent
Yoon

(10) Patent No.: US 6,757,376 B1
(45) Date of Patent: Jun. 29, 2004

(54) METHOD FOR REGISTERING PHONE NUMBER IN TELEPHONE

(75) Inventor: Sung-Pyo Yoon, Songnam-shi (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/217,744

(22) Filed: Dec. 21, 1998

(51) Int. Cl.[7] .............................................. H04M 1/00
(52) U.S. Cl. .......................... 379/355.01; 379/356.01
(58) Field of Search .............................. 379/355, 354, 379/368, 93.23, 355.09, 356.01, 140, 355.05, 142.04, 355.02

(56) References Cited

U.S. PATENT DOCUMENTS

| | | | | |
|---|---|---|---|---|
| 5,267,308 A | * | 11/1993 | Jokinen et al. | 379/354 |
| 5,568,546 A | * | 10/1996 | Marutiak | 379/355.05 |
| 5,592,546 A | * | 1/1997 | Takahashi | 379/355.05 |
| 5,790,652 A | * | 8/1998 | Gulley et al. | 379/368 |
| 6,064,725 A | * | 5/2000 | Nakanishi | 379/140 |
| 6,223,058 B1 | * | 4/2001 | Sudo et al. | 455/564 |
| 6,249,579 B1 | * | 6/2001 | Bushnell | 379/356.01 |
| 6,285,364 B1 | * | 9/2001 | Giordano et al. | 345/804 |
| 6,404,811 B1 | * | 6/2002 | Cvetko et al. | 375/240.01 |

* cited by examiner

Primary Examiner—Minsun Oh Harvey
Assistant Examiner—Jefferey Harold
(74) Attorney, Agent, or Firm—Dilworth & Barrese LLP

(57) ABSTRACT

A method is provided for registering a dialed phone number in a telephone having a speed dial list and a redial list. The method includes the step of determining whether the dialed phone number is registered in the speed dial list, upon receipt of the dialed phone number. Speed dial information for the dialed phone number is displayed and registered in the redial list, when the dialed phone number is registered in the speed dial list. Then, it is determined whether the dialed phone number is registered in the redial list, when the dialed phone number is not registered in the speed dial list. A dialing frequency of the dialed phone number is set to one and the dialed phone number is registered in the redial list, when the dialed phone number is not registered in the redial list. The dialing frequency is increased by one when the dialed phone number is registered in the redial list, and then it is determined whether the dialing frequency is one of greater than and equal to a predetermined value. The dialed phone number is registered in the speed dial list, when the dialing frequency is one of greater than and equal to the predetermined value.

2 Claims, 2 Drawing Sheets

METHOD FOR REGISTERING PHONE NUMBER IN TELEPHONE

BACKGROUND OF THE INVENTION

1. Field of the Invention

The present invention relates to telephones and, in particular, to a method for registering a dialed phone number in a speed dial list and a redial list of a telephone.

2. Description of the Related Art

In general, a telephone (e.g., a wired phone, a cordless phone and a mobile phone) stores a phone number dialed by a user in a redial buffer for future use. In such a case, the user need only press a redial button in order to re-dial the previously dialed phone number. The telephone then automatically sends the last dialed phone number stored in the redial buffer. Since the structure of a telephone is well known in the art, it will not be described in detail herein.

FIG. 1 is a flowchart illustrating a conventional method for registering a dialed phone number in a redial list of a telephone. Initially, the user places the phone in an off-the-hook condition and dials a phone number. Upon reception of the dialed phone number (step 111), an exchange forms a speech path to a called subscriber. When the speech path is formed, the calling (originating) subscriber can talk over the telephone with the called subscriber. Upon the completion of the telephone conversation, one of the calling and called subscribers places the phone in an on-the-hook condition to terminate the call (step 113).

After the call is terminated, a controller of the telephone compares the currently dialed phone number with the last dialed phone number stored in the redial buffer (step 115). If the currently dialed phone number is not identical to the last dialed phone number stored in the redial buffer, then the currently dialed phone number is stored in the redial buffer (step 117). However, if the currently dialed phone number is identical to the last dialed phone number, then the currently dialed phone number is discarded (step 119).

It is to be appreciated that the conventional phone number registering method cannot inform a user whether or not a currently dialed phone number is already registered in a speed dial (or memory dial) list. Accordingly, the user should register the currently dialed phone number. However, in such a case the same phone number may be repeatedly registered, thereby wasting memory resources.

SUMMARY OF THE INVENTION

It is an object of the present invention to provide a method for registering a dialed phone number in a redial list or a speed dial list depending on the registration status of the dialed phone number.

To achieve the above and other objects, a method is provided for registering a dialed phone number in a telephone having a speed dial list and a redial list. The method includes the step of determining whether the dialed phone number is registered in the speed dial list, upon receipt of the dialed phone number. Speed dial information for the dialed phone number is displayed and registered in the redial list, when the dialed phone number is registered in the speed dial list. Then, it is determined whether the dialed phone number is registered in the redial list, when the dialed phone number is not registered in the speed dial list. A dialing frequency of the dialed phone number is set to one and the dialed phone number is registered in the redial list, when the dialed phone number is not registered in the redial list. The dialing frequency is increased by one when the dialed phone number is registered in the redial list. Then, it is determined whether the dialing frequency is one of greater than and equal to a predetermined value. The dialed phone number is registered in the speed dial list, when the dialing frequency is one of greater than and equal to the predetermined value.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Initially, it is to be appreciated that a telephone to which the present invention is applied should include a memory having a speed dial table (or list) for storing speed dial numbers and a redial table (or list) for storing redial numbers.

Figure 1:
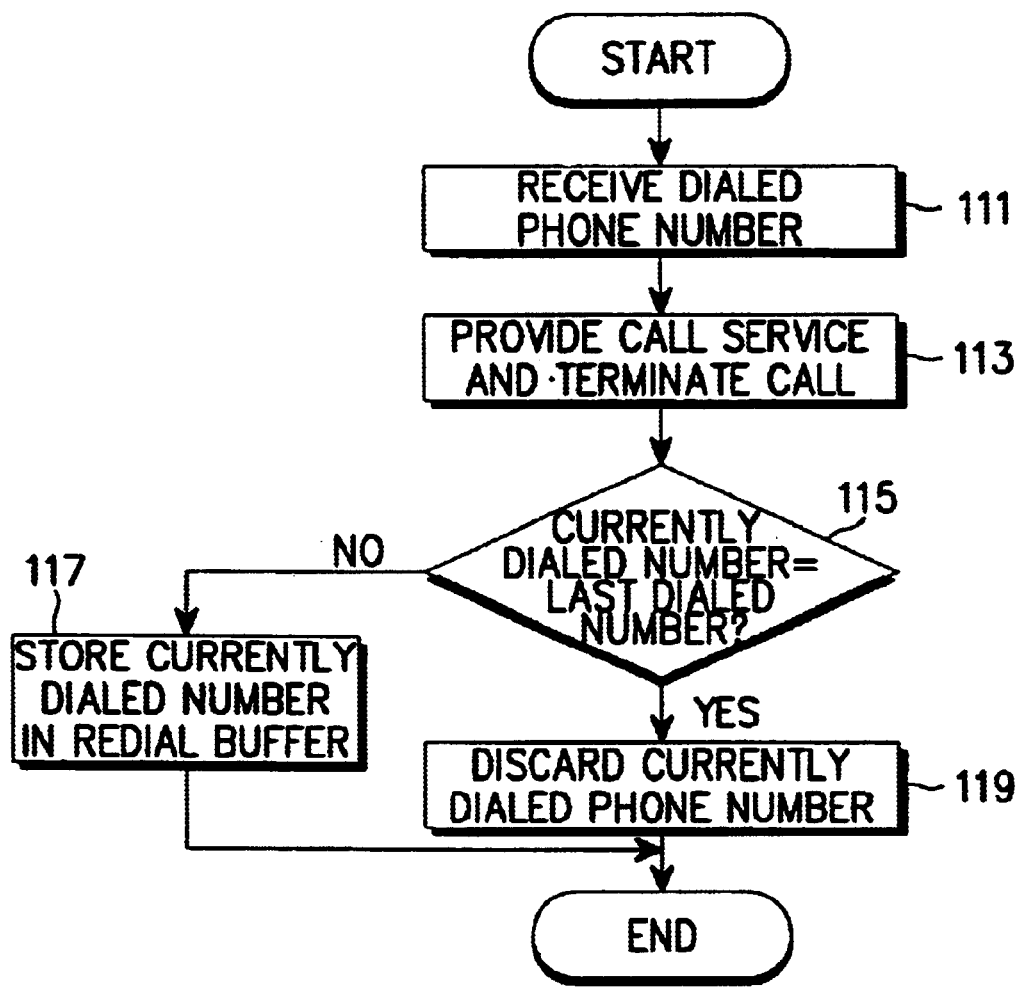
FIG. 1 is a flowchart illustrating a conventional method for registering a dialed phone number in a redial list of a telephone.
Figure 2:
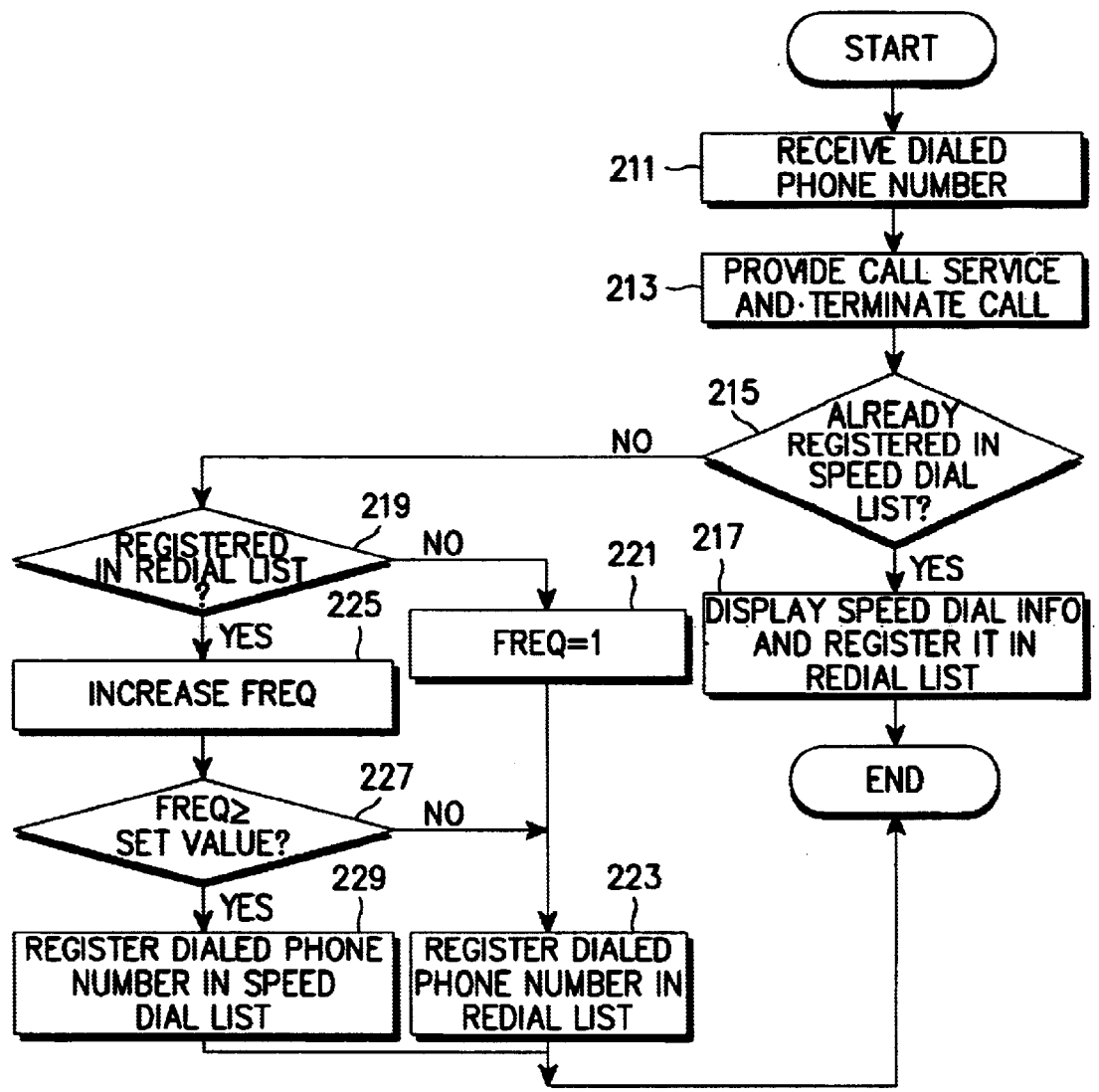
FIG. 2 is a flowchart illustrating a method for registering a dialed phone number in a redial list or a speed dial list of a telephone according to an embodiment of the present invention.

FIG. 2 is a flowchart illustrating a method for registering a dialed phone number in a redial list or a speed dial list of a telephone according to an embodiment of the present invention. In sum, the method includes the steps of: determining whether or not a dialed phone number is registered in the speed dial list of the telephone; recording the dialing frequency of the dialed phone number and registering the dialed phone number in the redial list, when the dialed phone number is not registered in the speed dial list; and automatically registering the dialed phone number in the speed dial list, when the dialing frequency of the dialed phone number exceeds a predetermined value. Further, when the user dials a phone number which is already registered in the speed dial list, the telephone displays information indicative of this situation and registers the speed dial position and its associated name in the redial list.

Referring to FIG. 2, when a user places a telephone in an off-the-hook condition and dials a phone number, a controller of the telephone stores the input phone number in a dial buffer (step 211) and sends the phone number to an exchange to form a speech path to a called subscriber. When the speech path is formed, the user (i.e., calling subscriber) can talk over the telephone with the called subscriber and upon completion of the telephone conversation, one of the calling and called subscribers will place his phone in an on-the-hook condition in order to terminate the call (step 213).

Then, the controller of the telephone searches the speed dial list to determine whether or not the dialed phone number stored in the dial buffer is already registered in the speed dial list (step 215). If the dialed phone number is already registered in the speed dial list, then the controller of the telephone displays the speed dial position (or address) and its associated name on a display of the telephone, and stores this information in the redial list (step 217).

However, if it is determined that the dialed phone number is not registered in the speed dial list, then the controller of the telephone searches the redial list to determine whether or not the dialed phone number is registered in the redial list (step 219). If it is determined that the dialed phone number is not registered in the redial list, then the controller of the telephone sets a dialing frequency counter FREQ equal to "1" (step 221), and registers the phone number in the redial list (step 223).

However, if it is determined that the dialed phone number is registered in the redial list, then the controller of the telephone increases the count value of a dialing frequency counter FREQ by "1" (step 225), and checks whether or not the count value of the dialing frequency counter is greater than, or equal to, a predetermined value (step 227). If the dialing frequency FREQ is smaller than the predetermined value, then the controller of the telephone registers the dialed phone number in the redial list (step 223). However, if the dialing frequency FREQ is greater than, or equal to, the predetermined value, then the controller of the telephone automatically registers the dialed phone number in the speed dial list (step 229). That is, the controller of the telephone automatically registers the dialed phone number in an empty position of the speed dial list, when the dialing frequency of the dialed phone number exceeds the predetermined dialing frequency.

As described above, a telephone implementing the method according to the present invention can automatically check whether or not a dialed phone number is already registered in the speed dial list before registering the dialed phone number in the redial list. Thus, it is not necessary for the user to search the speed dial list in order to register the dialed phone number. In addition, the dialed phone number is registered in the redial list together with the speed dial position and its associated name, thereby facilitating the use of the speed dial function and the redial function. Moreover, frequently used phone numbers are automatically registered in the speed dial list, thereby relieving the user from having to individually register the frequently used phone numbers to the speed dial list.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for registering a dialed phone number in at least one of a speed dial list and a redial list of a telephone, comprising the steps of:

dialing a phone number;

determining whether the dialed phone number is registered in the speed dial list, upon dialing of the phone number;

displaying speed dial information for the dialed phone number and registering the information in the redial list, when the dialed phone number is registered in the speed dial list;

determining whether the dialed phone number is registered in the redial list, when the dialed phone number is not registered in the speed dial list;

setting a dialing frequency of the dialed phone number to one and registering the dialed phone number in the redial list, when the dialed phone number is not registered in the redial list;

increasing the dialing frequency by one when the dialed phone number is registered in the redial list, and determining whether the dialing frequency is greater than or equal to a predetermined value; and registering the dialed phone number in the speed dial list, when the dialing frequency is greater than or equal to the predetermined value.

2. A method for registering a dialed phone number in at least one of a speed dial list and a redial list of a telephone, comprising the steps of:

dialing a phone number;

determining whether the dialed phone number is registered in the speed dial list of the telephone;

displaying speed dial information of the dialed phone number when it is determined that the dialed phone number is registered in the speed dial list;

recording a dialing frequency of the dialed phone number and registering the dialed phone number in the redial list, when the dialed phone number is not registered in the speed dial list; and automatically registering the dialed phone number in the speed dial list, when the dialing frequency of the dialed phone number exceeds a predetermined value.

* * * * *